Feb. 7, 1939.  C. S. HERMAN  2,145,929
ANGLING SERVICE
Filed Sept. 29, 1937
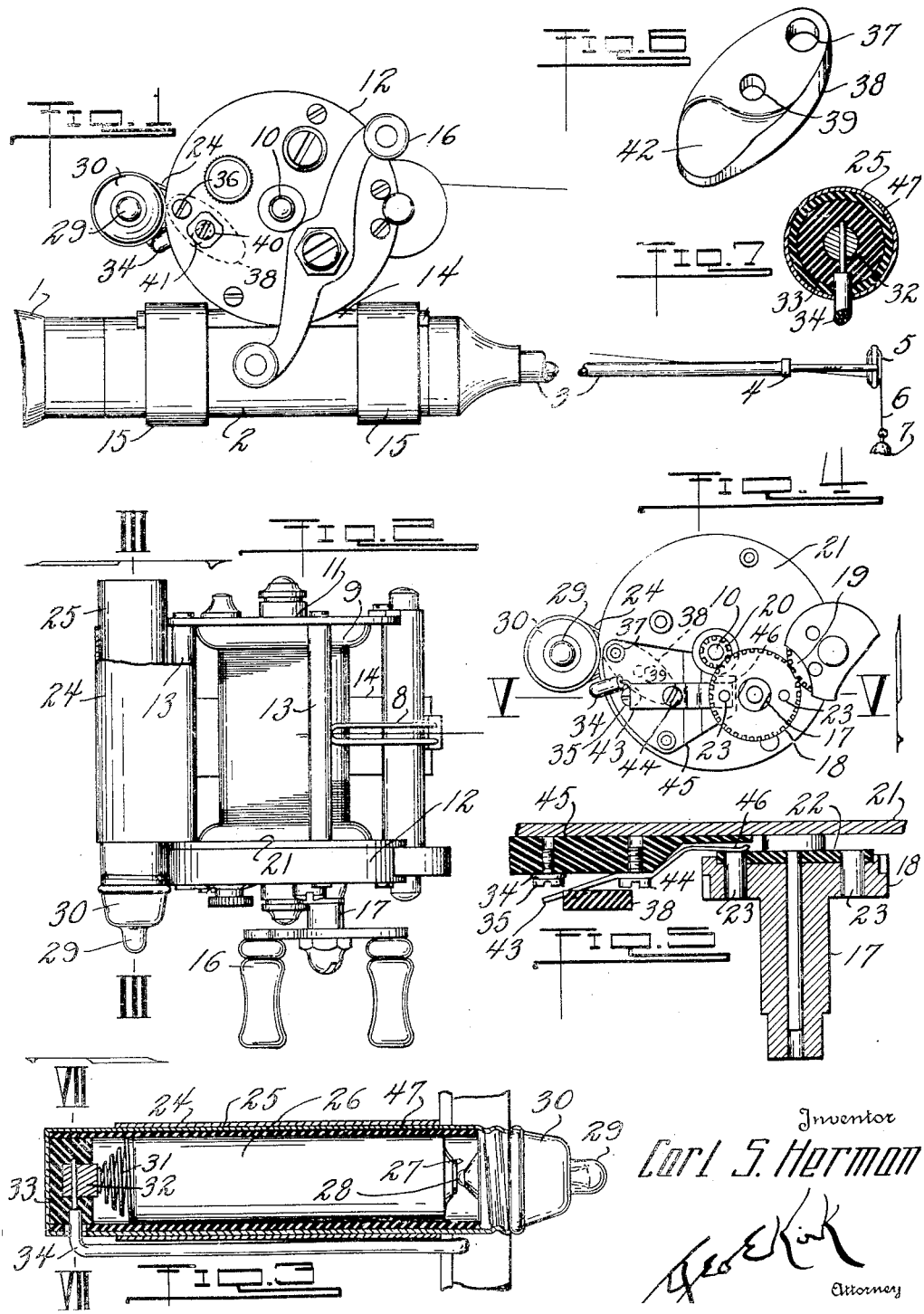
Inventor
Carl S. Herman
Attorney Patented Feb. 7, 1939

2,145,929

UNITED STATES PATENT OFFICE 2,145,929

ANGLING SERVICE

Carl S. Herman, Columbus, Ohio

Application September 29, 1937, Serial No. 166,255

1 Claim. (Cl. 242—84.1)

This invention relates to automatic telltales for anglers.

This invention has utility when incorporated in connection with line reels to disclose attack on bait and as to line withdrawal facts.

Referring to the drawing:

Fig. 1 is a side elevation, with parts broken away, of a reel in mounting position on a fishing rod or pole;

Fig. 2 is a view looking down on the reel of Fig. 1;

Fig. 3 is a section on the line III—III, Fig. 2, of the electric flashlight and cell structure;

Fig. 4 is a view of the end of the reel of Fig. 1, with parts broken away;

Fig. 5 is a section on the line V—V, Fig. 4, showing the cut-out switch and the flasher control for the reel;

Fig. 6 is a detail perspective view of the cut-out switch controller arm; and

Fig. 7 is a section on the line VII—VII, Fig. 3, showing the flashlight cell connection to its conductor lead.

Grip or handle 1 of the line pole has reel mounting section 2 and rod section 3 extending therefrom past guides 4, 5, for line 6 to bait 7 of the desired character which may suit the purposes of the fisherman, whether such be artificial lures or edible bait. This line 6 passes to the bait through guide 8 from drum 9 of the reel proper mounted on shaft 10 in a housing having heads 11, 12, and intermediate spacing rods 13. A pair of these rods carries portion 14 engaged by holding rings 15 in locating this reel at the reel seat 2 on the pole. This reel adjacent the head 12 has operating crank 16 on stub shaft 17 (Figs. 4, 5) for operating gear 18, not only effective through meshing gear 19 to effect transverse travel of the guide 8 but effective through meshing pinion 20 to rotate the drum 9. Through the mesh relation between the pinion 20 and the gear 18 the rate of rotation of the drum 9 is a function of the rotation of this gear 18. Location of this gear 18 is in the head 12 having disk 21. The gear 18 carries insulation disk 22 having pair of contact terminals 23 diametrically located and flush with the insulation plate 22. It is to be noted that the housing section 12 is of a form adapted to enclose the gearing for the reel and that such normal housing section without transformation of dimension is effective to enclose or house the switch and its contacts as disclosed herein.

Anchored along rod 13 by clip or sleeve 24 is electric battery device 25 enclosing dry cell 26 having end terminal 27 contacting terminal 28 of flashlight bulb 29 protruding through cover 30 of this electric battery device 25. Remote from this cover 30 and in this electric battery device 25 is spring 31 from the opposite terminal of this dry cell 26 having contact 32 in insulation block 33. From this contact or terminal 32 extends lead 34 lengthwise along the battery device and into the head 12 to terminal 35 (Fig. 5).

Pivot pin 36 (Fig. 1) is through opening 37 (Fig. 6) in insulation block 38 which at opening 39 engages pin 40 extending through opening 41 in the head 12. This opening 41 is on an arc from the pivot pin 36 to swing this insulation block 38 so that its cam face 42 may ride on spring arm 43 to thrust such into contact position with the terminal 35, thereby to connect this arm 43, as having fixed mounting 44, in insulation block 45 to extend past such fixed mounting 44 to arm 46, thereby tilting away from the insulation block 45 more firmly to ride against the insulation plate 22 and engage the contacts 23 as having closing circuit therefrom through the stud shaft 17 and reel head 12 spacing rod 13, shell 24, battery device 25, cap 30, in completing the circuit through the flashlight bulb 29 to the cell 26 having insulation jacket 47.

As the cut-out switch pin 40 is shifted toward the axis 10 of the reel, the arm 43 is clear of the electric terminal 35. However, as this switch pin 40 is shifted toward the periphery of the reel head 12, the cam face 42 tilts the arm 43 into circuit closing position with the terminal 35, and as the reel 9 turns and transmits such rotation to the gear 18, contacts 23 pass the conductor arm 46 and a series of flashings occur at the bulb 29. This is effected without any resistance to the draw on the line by the fish or other attack at the bait. There is no noise or audible signal. The disclosure is a visible telltale for the angler, communicating to such angler not only that the bait has been disturbed but say in some instances there may be a short drag only. This sort of attack is of information to the angler, for instance that it may not be the type of game sought, say if it were a crab seeking to remove edible bait and making but short distance of travel in such operation. However, should the attack on the bait be say by a bass or perch, there is tendency not only to grab the bait but to continue travel therewith. The rate of such travel is a further telltale to the angler as to the character of the fish, and thereby discloses to the angler this desirable information to be adopted in responding to the requirements in landing such fish.

What is claimed and it is desired to secure by Letters Patent is:

An angling accessory embodying a line adapted to be cast, a reel rotatable in response to said cast for controlling the out extent of the line, gearing for the reel, a housing adapted to enclose said gearing, an electric cell mounted solely on the reel, a light bulb carried by the cell, a conductor from the cell, a terminal contact at the reel end to which the conductor extends, an additional contact adjacent said terminal contact and operatively connected to said reel, said contacts being enclosed by said housing, there being conductor extension from said additional contact to the cell to complete electric circuit therewith to the bulb as the contacts coact, whereby the rotation of said reel effects flashing of the light in synchronism with such rotation.

CARL S. HERMAN.